Figure 1:
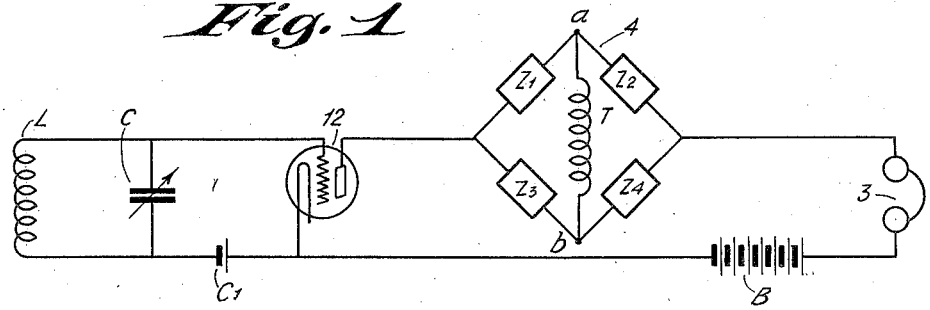

INVENTOR
WALTER VAN B. ROBERTS

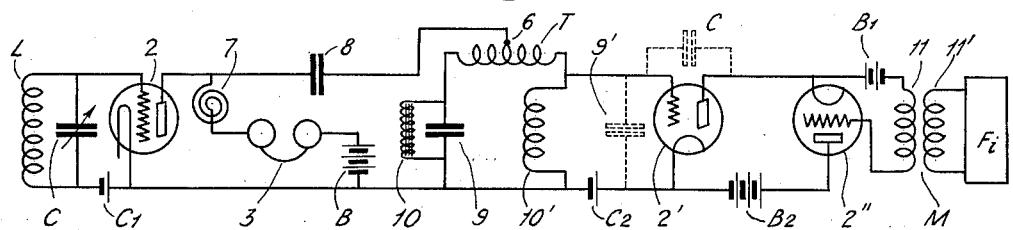
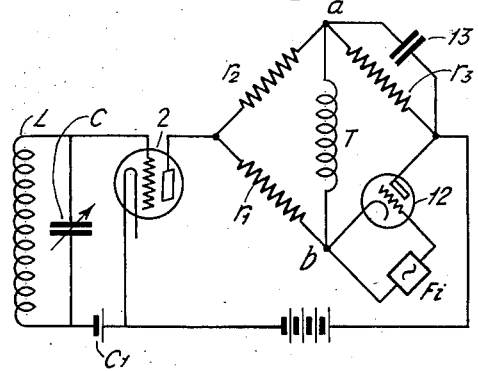
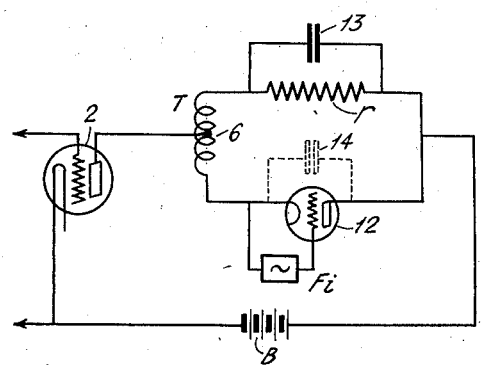
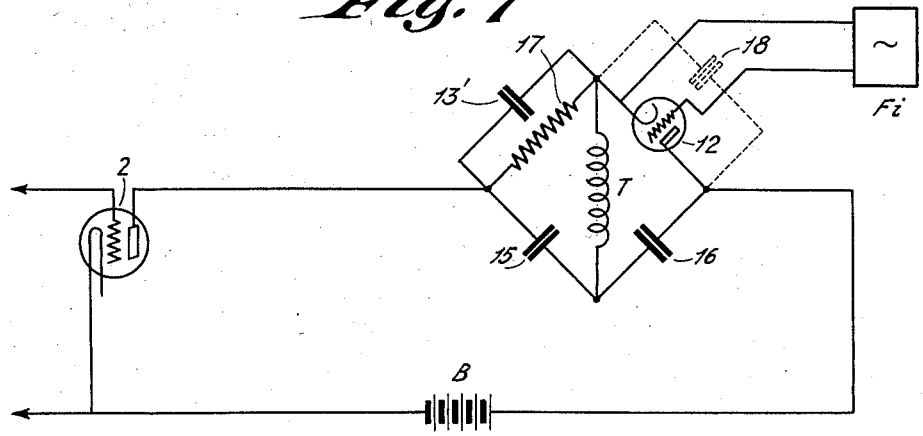

Patented July 16, 1935

2,008,261

UNITED STATES PATENT OFFICE 2,008,261

SUPERREGENERATIVE CIRCUITS

Walter van B. Roberts, Princeton, N. J., assignor to Radio Corporation of America, a corporation of Delaware Application February 5, 1932, Serial No. 591,073

14 Claims. (Cl. 250—20)

My present invention relates to regenerative systems, and more particularly to novel methods of, and means for, producing super-regeneration in receiving circuits.

In my copending application Serial No. 351,411, filed March 30, 1929, there has been disclosed a method of producing super-regeneration in a receiving circuit which comprises utilizing a reverse feed-back action for rapid quenching of radio frequency oscillations during the damping period, without introducing appreciable damping into the oscillation circuit during the regeneratively amplifying, or building-up period. It was pointed out in the said application that the method of periodically reversing the phase of feed-back in a super-regenerative circuit was desirable because it insured "building-down" oscillations during the reversed feed-back period to a slightly greater extent, due to the inherent resistance helping to "build down", than they are built up during the direct feed-back period, thus preventing any spilling over into sustained radio frequency oscillation.

Specifically, my prior application disclosed a receiving circuit of the super-regenerative type in which a pair of tubes of similar characteristics was utilized, one of the tubes functioning as the amplifier and having a feed-back coil associated therewith, the other tube having a second feed-back coil associated therewith and functioning as a reverse feed-back means, the entire operation of the amplifying action being initiated by an interrupting super-audible frequency in such a manner that the reverse feed-back means commenced to quench oscillations in the amplifier tube prior to the instant when oscillations of the amplifier would otherwise attain an undesirable amplitude. Various advantages for this specific type of super-regenerative system were described in the aforementioned application. However, it will be observed that the means for providing the reversed feed-back action utilized an additional tube.

Now, I have discovered a method of, and devised means for, utilizing the principle of the aforementioned application in connection with a single tube. That is to say, in the present application there is disclosed a method of, and means for, periodically reversing the phase of feed-back in a super-regenerative system, of a single tube. Essentially, arrangements disclosed in this application utilize an element of an electrically balanced bridge for alternately providing regenerative and degenerative feed-back between the output and input circuit of an amplifier tube, the periodic reversal of the phase of the feed-back being caused by the action of a source of interrupting frequency current in unbalancing the bridge.

Accordingly, it may be stated that it is one of the prime objects of my present invention to provide a method of, and means for, producing super-regeneration in an electrical circuit including an electron discharge tube which comprises utilizing a reverse feed-back action for rapid quenching of the radio frequency oscillations during the damping period, the phase of the feed-back being periodically reversed by unbalancing, at a predetermined rate, a normally balanced electrical system.

Another important object of the present invention is to provide a regenerative electrical circuit comprising a single tube provided with an input and output circuit, a normally balanced electrical system being disposed in one of said circuits, and means utilized in conjunction with the normally balanced system for varying one or more elements of the said system to periodically unbalance the system first in one direction and then in an opposite direction whereby the phase of feed-back between the output and input circuits of the tube will be periodically reversed and the circuit will operate in a super-regenerative manner.

Another object of the present invention is to provide a super-regenerative circuit consisting of a space discharge device provided with a tunable input circuit and an output circuit, a normally balanced electrical bridge being disposed in the output circuit, one of the elements of the bridge being coupled to the tuned input circuit to transfer energy from the output circuit thereto, there being additional means provided for varying one or more elements of the bridge in such a manner as to periodically unbalance the bridge in opposite directions whereby the phase of feed-back between the output and input circuits will be periodically reversed.

Still other objects of the present invention are to simplify the circuit shown in my aforementioned copending application wherein an additional tube is employed for securing the reversed phase feed-back, and to more particularly provide a super-regenerative circuit which is not only reliable and efficient in operation, but economically manufactured and assembled.

The novel features which I believe to be characteristic of my invention are set forth in particularity in the appended claims, the invention itself, however, as to both its organization and method of operation will best be understood by reference to the following description taken in connection with the drawings in which I have indicated diagrammatically several circuit arrangements whereby my invention may be carried into effect.

In the drawings,

Fig. 1 diagrammatically shows a circuit embodying the basic principle of the present invention, Figs. 2 to 7 inclusive show different specific embodiments of the arrangements utilizing the basic principle shown in generalized manner in Fig. 1.

Referring to the accompanying drawings wherein like characters of reference indicate the same parts in the different figures, Fig. 1 shows a space discharge device 2, which device may be an electron discharge tube of any well known type. This tube may comprise, for example, a triode, it being clearly understood that any other type of tube well known to those skilled in the art may readily be employed in the present invention. A parallel resonant circuit comprising an inductance coil L and a variable tuning condenser C is connected between the control electrode and the cathode of the tube 2 in the well known and usual manner. A source of biasing voltage $C_1$ is connected in the control electrode circuit of the tube 2 to provide proper negative biasing voltage for the said control electrode or grid. Between the anode and cathode of the tube 2 there is connected a path including a normally balanced electrical system 4, a reproducer 3, and a source of anode potential B. The reproducer 3 is specifically shown as being of the head set type, it being understood however that any other type of reproducer may be employed.

The balanced electrical system 4 specifically comprises a bridge arrangement including arms $z_1, z_2, z_3$ and $z_4$. Each of these arms is in electrical nature an impedance, and is conventionally represented to denote that each impedance may be of any desired specific electrical nature. Thus, these impedances may be resistive, or reactive, or complex, but preferably they should be so chosen that the equation of balance $z_1/z_2 = z_3/z_4$ may be satisfied for all frequencies. A coil T is connected, as the diagonal arm of the bridge between the points $a$ and $b$, the coil T being inductively coupled to the coil L.

It is to be understood that the resonant circuit L, C is not necessarily the signal collecting circuit of the system shown in Fig. 1. It is possible to connect a pre-selector circuit, as for example, a tunable band pass circuit or a tuned stage of radio frequency amplification, or an untuned stage of radio amplification, or all three, or any two of these, between a signal collecting device, as an antenna, and the resonant radio frequency circuit L, C. Additionally, it is quite obvious that the circuit L, C need not necessarily be tunable to different frequencies, but may readily comprise a circuit tunable to a fixed intermediate frequency, as in the case of an intermediate frequency amplifier employed in a superheterodyne receiver. In any case, the operation of the system, with regard to the functioning of the bridge arrangement 4 is the same, and is independent of the particular use to which the resonant circuit L, C is put.

Considering, now, the principle underlying the operation of the arrangement shown in Fig. 1, if the ratio of $$\frac{z_1}{z_2}$$

is substantially equal to $$\frac{z_3}{z_4}$$

it will be obvious that no current can flow through the diagonal path including the coil T, since the drop of potential between points $a$ and $b$ must necessarily be equal to zero. In this balanced condition of the bridge circuit, points $a$ and $b$ are at substantially the same electrical potential and may be termed a pair of conjugate neutral points of the bridge or balanced electrical system. Hence, when the bridge 4 is balanced, the transfer of energy between the coils T and L is at a minimum, and may be made even equal to zero. However, if one or more of the impedances $z$ is varied from that value at which balance of the bridge is secured, obviously the bridge will be unbalanced and current will flow in one direction or the other through coil T.

Again, the direction of unbalance can be regulated by varying a predetermined one of the impedances $z$. By varying one or more of the impedances $z$ about the value giving a balance so as to periodically unbalance the bridge first in one direction and then the other, the phase of the feed-back between coils T and L will be periodically reversed, and the circuit operated in a super-regenerative manner. In other words, the bridge 4 is utilized, in conjunction with a device for periodically upsetting the bridge balance in alternately different directions, to provide a reverse feed-back between coils T and L for rapid quenching of radio frequency oscillations during the damping period of super-regenerative operation. The reverse feed-back action is periodically substituted for the regenerative feed-back between coils T and L by the aforementioned device which is utilized for periodically upsetting the balance of the bridge 4.

It is believed that the principle of the present invention has now been sufficiently described in connection with Fig. 1. Accordingly, there will now be described various embodiments utilizing the aforementioned basic principle. Thus, in Fig. 2 the bridge 4 comprises a pair of iron core radio frequency chokes $X_1$ and $X_2$. The common terminal 5 of the chokes is connected to one side of the reproducer 3, while the other terminals of the chokes are connected to opposite sides of the feed-back coil T which is coupled to coil L. The coil T has its mid-point 6 connected to the anode of tube 2. A source of interrupting frequency current $F_1$ is inductively coupled to both chokes $X_1$ and $X_2$, a radio frequency choke 7 being disposed in series with the source $F_1$ in order to prevent the induction of radio frequency current in the $F_1$ circuit.

Figure 2:
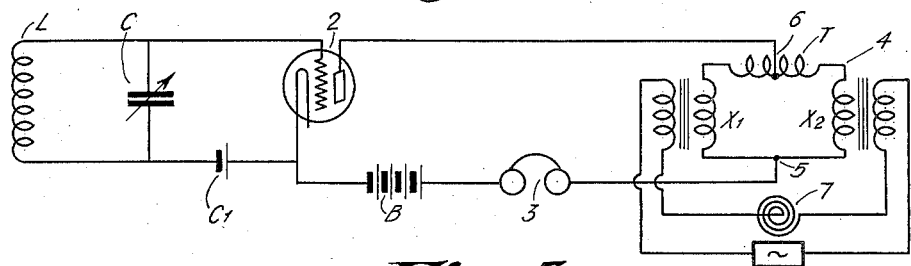

Considering, then, the operation of the embodiment shown in Fig. 2 it is to be understood that the iron cores of chokes $X_1$ and $X_2$ are partly magnetically saturated by the plate current from the source B. The interrupting frequency current in the separate windings decreases the flux density of, and hence increases the radio frequency inductance of the choke $X_1$ simultaneously with the increase of flux density, hence decrease of the radio frequency inductance of the choke $X_2$ and vice versa. Thus, it will be seen that the direction of the effective coupling of coil T to coil L is periodically reversed. Explained from the point of view of a balanced bridge operation, the functioning of the arrangement shown in Fig. 2 may be stated to be as follows:

$X_1$ and $X_2$ correspond to arms $z_2$ and $z_4$ of Fig. 1. The two halves of coil T correspond to arms $z_1$ and $z_3$ of Fig. 1, while the total magnetic flux from coil T as a whole corresponds to the flux from coil T of Fig. 1. It would, of course, be possible to make Fig. 2 a complete bridge like Fig. 1, but it is not necessary in order to get the desired results in Fig. 2.

Figure 3:
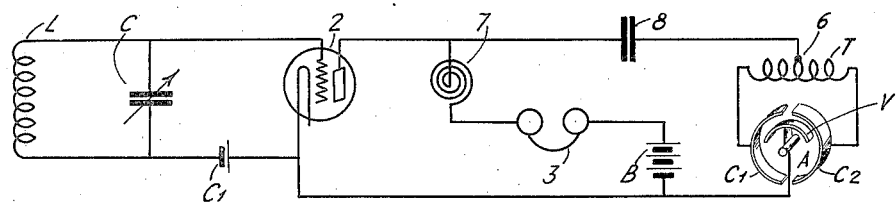

In Fig. 3 there is shown a second embodiment of the basic principle shown in Fig. 1. In this embodiment the device employed for periodically upsetting the balance of the bridge arrangement including the coil T is quite different from the device utilized in Fig. 2. Here, again, the midpoint 6 of the coil T of the bridge arrangement is connected to the anode of the tube 2, but through a direct current blocking condenser 8. The radio frequency choke 7 is connected between one terminal of the reproducer 3 and the junction of the anode of tube 2 and one side of the condenser 8. Each terminal of the feedback coil T is connected to an arcuate metallic stationary plate c. Thus, the arcuate plate $c_1$ is connected to one side of the coil T, while the arcuate plate $c_2$ is connected to the opposite side of the said coil.

It will be noted that the plates $c_1$ and $c_2$ actually provide a metallic ring which is split at diametrically disposed portions of the ring. At substantially the center of the ring there is disposed an axle or shaft A adapted to be driven by any well known type of electrical motor device at a desired reversal frequency. An arcuate, metallic, rotor plate V is secured to the shaft A in such a manner that its circle of rotation is concentric with the ring including the plates $c_1$ and $c_2$, it being understood that the width of plate V is substantially equal to the width of the plates $c_1$ and $c_2$. It will be obvious, of course, that the rotor plate V in any angular position provides a certain amount of capacity with respect to the plate $c_1$ and another amount of capacity with respect to the plate $c_2$.

The relative value of these capacities clearly depends upon the angular position of the rotor V. It will, thus, be seen that rotating the shaft A at the desired reversal frequency results in a periodic substitution of reversed feed-back action by the coil T and coil L for the regenerative feed-back action between the same coils. This arrangement is equivalent in principle to a two throw single pole switch that alternately connects the cathode to first one end and then the other end of coil T, thus periodically reversing the phase of feed-back to the grid circuit.

Figure 3A:
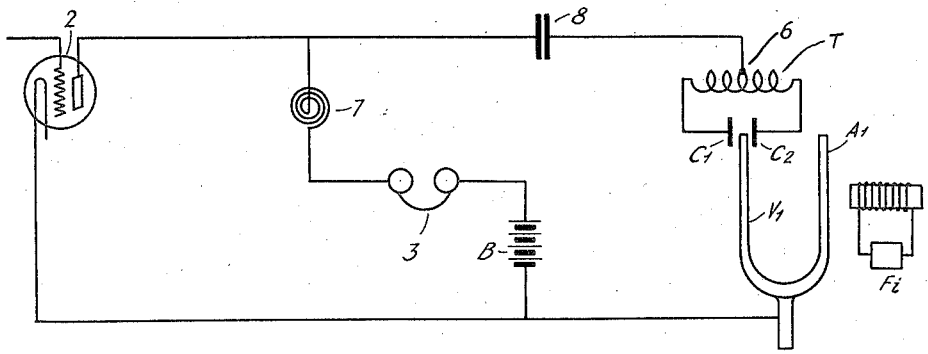

In Fig. 3a is shown an arrangement that can be used in place of the embodiment in Fig. 3. The fork leg $A_1$ is driven at the $F_1$ frequency, thus varying, at the same frequency the position of the leg $V_1$. The relative values of the capacities $c_1$, $V_1$ and $c_2V_1$ will depend upon the $F_1$ frequency. Instead of a fork, a piezo-electric or magnetostriction oscillator may be used, these devices being well known to those skilled in the art.

In Fig. 4 there is shown another embodiment of the basic principle shown in Fig. 1. In the arrangement shown in Fig. 4 the feed-back coil T has one of its terminals connected to a condenser 9, the latter being shunted by a radio frequency choke coil 10. The mid-point 6 of the coil T is again connected to the anode of tube 2 through the blocking condenser 8. The other terminal of coil T is connected to the grid of tube 2', a grid biasing source $C_2$ having its positive terminal connected to the cathode of tube 2' and its negative terminal connected to the common junction of the low potential terminals of the choke 10 and condenser 9. A radio frequency choke coil 10' is connected in series with the coil T and in parallel with the condenser 9 which is in shunt across the grid and cathode of tube 2'.

The anode of tube 2' is connected to the cathode of tube 2" and to the positive side of source $B_1$, the negative side of said source being connected through the primary coil 11 of transformer M, to the grid of tube 2". The anode of tube 2" is connected to the positive side of a potential source $B_2$, and the negative side of said latter source is connected to the cathode of tube 2'. A source of interrupting frequency voltage $F_1$ is connected across the secondary coil 11' of the transformer M.

The arrangement in Fig. 4 has for its purpose the obtaining of the same results as the arrangement shown in Fig. 3 without employing mechanical parts. The condenser 9 is balanced by the input capacity 9', shown in dotted lines, of tube 2'. The tube 2" functions as a resistance in the plate circuit of tube 2'. The input capacity of tube 2' depends on the resistance of tube 2" which is varied above and below its normal value periodically by the interrupting frequency potential acting on the grid of the tube 2". The chokes 10 and 10' are employed to provide a direct current path between the grid and cathode of tube 2', two chokes being utilized to preserve a balance between the impedances of the condensive branches, except as upset by the interrupting frequency, at all frequencies. Capacities 9' and C may be increased by the addition of actual condensers in parallel with them.

Another variation of the bridge arrangement in the anode circuit of tube 2 is shown in Fig. 5 wherein the arms of the bridge comprise three resistors $r_1$, $r_2$, $r_3$, and the fourth arm of the bridge comprises a tube 12. The anode of tube 12 is connected to the positive side of source B and to one terminal of the resistor $r_3$. The feedback coil T is connected as the diagonal arm between points $a$ and $b$, the coil T and the coil L being inductively coupled. The source of interrupting frequency current $F_1$ is connected across the grid and cathode of tube 12. A condenser 13 is connected in shunt with the resistor $r_3$. The operation of this arrangement may be described in the following manner:—

When resistors $r_1$, $r_2$, $r_3$ and condenser 13 are adjusted to balance the bridge for the radio frequency no current flows in coil T. When alternating voltage is applied to the control electrode of tube 12, however, the plate circuit resistance of this tube is varied alternately above and below the balancing value, with the result that radio frequency current flows in coil T first in one phase and then in the opposite phase. There is produced in this way a periodic reversal of the phase of feed-back from coil T to coil L. Condenser 13 is added to compensate for the inherent plate to cathode capacity of tube 12.

In each of Figs. 6 and 7, both of which show further variations of the bridge arrangement in the anode circuit of the tube 2, the input circuit of tube 2 in each of these figures is omitted for the sake of simplification. In Fig. 6 one terminal of the feed-back coil T is connected in series with the anode of tube 12 through a resistor $r$. The latter is shunted by a condenser 13. The other terminal of coil T is connected to the cathode of tube 12, the source of interrupting frequency current $F_1$ being connected between the cathode and grid of tube 12. The inherent capacity between cathode and anode of tube 12 is denoted by the numeral 14 and shown in dotted lines. The bridge arrangement in Fig. 6 operates exactly the same in principle as that of Fig. 5, the only change being the substitution of a pair of inductive arms for a pair of resistive arms, and the use of these inductive arms as the feed-back coil. A separate feed-back coil could, if desirable, be retained in which case it would be connected in parallel with the entire coil T.

In Fig. 7, the feed-back coil T is shown as the diagonal arm of the bridge, the bridge arms in this arrangement comprising condensers 15 and 16, and a resistor 17 and tube 12. The resistor 17 is shunted by the condenser 13', and the cathode to anode capacity of tube 12 is denoted by the reference numeral 18 shown in dotted lines. Here, again, the source of interrupting frequency current $F_1$ is connected between the cathode and grid of tube 12. The operation of this arrangement is the same as that of Fig. 6, the only change being that a pair of capacitive arms are substituted for a pair of resistive arms and condenser 13' is located across the single remaining resistor.

It should be clear from the above description of Figs. 2 to 7 inclusive that the electrical structure of the bridge 4 of Fig. 1 may assume widely different characteristics. The impedance $z$ of the bridge 4 has been shown to be in each of Figs. 2 to 7 inclusive, resistors, inductances or capacities. Hence, it should be clearly understood that while I have shown and described several systems for carrying my invention into effect, it will be apparent to one skilled in the art that my invention is by no means limited to the particular organizations shown and described, but that many modifications may be made without departing from the scope of my invention as set forth in the appended claims.

For example, the bridge method here disclosed for reversal of phase of feed-back may also be practiced on the input side of the superregenerative circuit. That is, a simple tickler coil in the plate circuit may be coupled to the input resonant circuit in a fixed manner, while the input resonant circuit and the tube input electrodes form conjugate arms of a bridge whose balance is periodically upset in first one direction and then the other at a desired rate by means such as already described in connection with Figs. 2 to 7. Furthermore, it is obvious that the feed-back means need not be the single tickler or mutual inductance feed-back so far discussed. Broadly speaking any feed-back circuit the phase of whose feed-back may be periodically reversed by unbalancing means, may equally well be employed.

What I claim is:

1. A super-regenerative circuit comprising an electron discharge tube having an output circuit and a resonant input circuit, a normally balanced electrical system having a pair of conjugate neutral points disposed in said output circuit, said system including an inductively reactive element connected across said neutral points electrically coupled to said input circuit, and means electrically connected with said system for periodically unbalancing the system to reverse the phase of feed-back between said element and said input circuit.

2. A receiving circuit comprising a tube having its output circuit regeneratively coupled to a resonant circuit in its input circuit, a normally balanced bridge disposed in series in said output circuit and having four arms, and means electrically connected with said bridge for periodically unbalancing the latter in different directions.

3. In an amplifier provided with an input circuit and an output circuit having a pair of conjugate neutral points, the method of securing great amplification without building up sustained oscillations which comprises establishing an electrically balanced condition in said output circuit so that said neutral points are at substantially the same potential, and periodically disturbing said condition first in one direction and then in the other to provide a periodic reversal of the phase of potential between said neutral points and of feed-back between said output and input circuits.

4. The method of amplifying varying electric currents in an amplifier provided with input and output circuits which comprises impressing the varying potential of the current to be amplified upon the input circuit, establishing an electrically balanced condition in the output circuit, electrically coupling the output circuit to said input circuit so that there is no feedback in said balanced condition, and periodically disturbing said condition at a super-audible frequency whereby the phase of feed-back between the output and input circuits will be periodically reversed.

5. In apparatus for amplifying varying electric currents, an electron discharge tube provided with an output circuit and an oscillatory input circuit, a normally balanced bridge having a pair of conjugate neutral points in said output circuit, and means electrically connected to said bridge for periodically varying the total effective resistance of said input circuit about a mean value greater than zero, said bridge including an inductively reactive element connected across said neutral points and electrically coupled to said input circuit.

6. A receiving circuit comprising a tube having an output circuit and a resonant input circuit, a normally balanced bridge in said output circuit, and a source of super-audible interrupting frequency current coupled to said bridge in such a manner that the bridge is periodically unbalanced first in one direction and then in the other and a feedback connection between a portion only of said bridge and said resonant input circuit.

7. In an electrical circuit, a space discharge device provided with an input circuit and an output circuit, a bridge in said output circuit for normally establishing an electrically balanced condition therein, means including an inductively reactive element connected to opposite neutral points of said bridge and arranged to transfer energy from said output circuit to said input circuit, and additional means operatively connected with said bridge for periodically disturbing said normally balanced condition whereby the phase of said transfer is periodically reversed.

8. In an electrical transmission network, an electron discharge tube provided with an oscillatory input circuit and an output circuit, a normally balanced bridge connected in said output circuit including at least four impedances, one of said impedances being coupled to said input circuit to provide an energy transfer path to the latter, and means electrically connected with at least one of the impedances of said bridge for periodically unbalancing the bridge in such a manner that the phase of energy transfer between the output and input circuit of the tube is periodically reversed.

9. In a repeating circuit, an electron discharge tube provided with a resonant input circuit and an output circuit including a normally balanced bridge comprising at least two impedances and a coil inductively coupled to said input circuit, and a source of interrupting frequency current electrically connected with at least one of the impedances of said bridge, other than said coil, for periodically unbalancing the bridge whereby the phase of feed-back between said coil and said input circuit is periodically reversed.

10. In an amplifier circuit, an electron discharge tube provided with an oscillatory circuit across its input electrodes, said input circuit being tuned to a desired radio frequency, a normally balanced bridge network having a pair of conjugate neutral points connected between the anode and cathode of the tube, said network including an impedance connected across said neutral points and coupled to said input circuit for the transfer of radio frequency energy thereto, and means for disturbing the balance of said bridge in such a manner as to periodically reverse the phase of energy transfer between said impedance and said input circuit.

11. In combination, a single electron tube, having a grid and a plate circuit, opposing and substantially equally effective means serially connected in said plate circuit for feeding back energy from the plate circuit of said tube to its grid circuit, and further means for upsetting at a super-audible frequency the balance between said opposing feed-back means whereby the net feed-back is periodically reversed in phase.

12. A vacuum tube having a grid and a plate circuit, a balanced bridge network serially connected in said plate circuit and having a pair of conjugate neutral points, an inductively reactive impedance element connected across said neutral points and electrically connected to said grid circuit and means for rapidly varying the value of an element of said bridge network above and below its normal value whereby the bridge is unbalanced and an alternating current of high frequency flows through said impedance element.

13. A super-regenerative amplifier comprising a thermionic tube having an output circuit and an input circuit, a normally balanced bridge circuit having a pair of conjugate neutral points disposed in said output circuit, a circuit connected across said neutral points comprising an inductively reactive element coupled to said input circuit, a mechanical element electrically connected to said bridge circuit and means for operating said mechanical element at a high speed to periodically unbalance the bridge circuit so as to reverse the phase of feed-back between said reactive element and said input circuit.

14. In a device of the class described, the combination of a vacuum tube provided with an oscillatory circuit across its input electrodes, said input circuit being tuned to a desired radio frequency, a normally balanced bridge network connected between the anode and cathode of the tube, said bridge network including a coil inductively coupled to said input circuit and two condensers having a common electrode and mechanical means connected to said common electrode for rapidly moving it adjacent the other condenser electrodes to unbalance said bridge network.

WALTER van B. ROBERTS.